US008621319B2

(12) United States Patent
Moon et al.

(10) Patent No.: US 8,621,319 B2
(45) Date of Patent: Dec. 31, 2013

(54) METHOD AND APPARATUS FOR ITERATIVE DETERMINATION OF MIMO ITERATIVE RECEIVER

(75) Inventors: Young Jin Moon, Daejeon (KR); Dong Seung Kwon, Daejeon (KR); Jee Hwan Noh, Seoul (KR); Chungyong Lee, Seoul (KR)

(73) Assignees: Electronics and Telecommunications Research Institute, Daejeon (KR); Industry-Academic Cooperation Foundation, Yonsei University, Seoul (KR)

( * ) Notice: Subject to any disclaimer, the term of this patent is extended or adjusted under 35 U.S.C. 154(b) by 345 days.

(21) Appl. No.: 12/904,665

(22) Filed: Oct. 14, 2010

(65) Prior Publication Data
US 2011/0145671 A1 Jun. 16, 2011

(30) Foreign Application Priority Data

Dec. 14, 2009 (KR) .................. 10-2009-0124150
Feb. 10, 2010 (KR) .................. 10-2010-0012447

(51) Int. Cl.
*H03M 13/00* (2006.01)
(52) U.S. Cl.
USPC ....................................... 714/758
(58) Field of Classification Search
USPC ....................................... 714/758
See application file for complete search history.

(56) References Cited

U.S. PATENT DOCUMENTS

| 7,260,766 | B2 * | 8/2007 | Levy et al. ................. 714/780 |
| 7,720,181 | B2 | 5/2010 | Park et al. |
| 2007/0229329 | A1 * | 10/2007 | Maru ............................. 341/94 |
| 2007/0266274 | A1 * | 11/2007 | Lin ............................... 714/699 |
| 2008/0028277 | A1 * | 1/2008 | Cho et al. ..................... 714/758 |
| 2008/0225965 | A1 | 9/2008 | Pi et al. |
| 2009/0019338 | A1 * | 1/2009 | Obuchi et al. ............... 714/758 |
| 2009/0077457 | A1 * | 3/2009 | Ramesh et al. ............. 714/807 |
| 2009/0304125 | A1 | 12/2009 | Kim et al. |
| 2010/0150280 | A1 * | 6/2010 | Gutcher et al. ............. 375/341 |
| 2011/0004804 | A1 * | 1/2011 | Xu et al. ...................... 714/758 |
| 2011/0103323 | A1 * | 5/2011 | Wang et al. ................. 370/329 |
| 2011/0126068 | A1 * | 5/2011 | Lee et al. .................... 714/748 |
| 2011/0158302 | A1 | 6/2011 | Kim et al. |

FOREIGN PATENT DOCUMENTS

| KR | 10-0863702 | 10/2008 |
| KR | 10-0888502 | 3/2009 |
| KR | 10-2009-0064845 | 6/2009 |

* cited by examiner

*Primary Examiner* — Michael Maskulinski
*Assistant Examiner* — Neil Miles
(74) *Attorney, Agent, or Firm* — Staas & Halsey LLP

(57) ABSTRACT

A multiple input multiple output (MIMO) iterative receiver detects a soft log likelihood ratio value from a signal outputted from a transmitter and decodes the detected soft log likelihood ratio value in order to extract a hard value and a soft value from the detected soft log likelihood ratio value. After whether or not a CRC of the hard value is acknowledged is determined, a CRC of a data burst is determined or iteration of signal demodulation of the MIMO iterative receiver is determined by feeding back the soft value or a CRC of data is performed assembling signals of the burst unit in accordance with the determination result.

12 Claims, 14 Drawing Sheets

METHOD AND APPARATUS FOR ITERATIVE DETERMINATION OF MIMO ITERATIVE RECEIVER

CROSS-REFERENCE TO RELATED APPLICATION

This application claims priority to and the benefit of Korean Patent Application Nos. 10-2009-0124150 and 10-2010-0012447 filed in the Korean Intellectual Property Office on Dec. 14, 2009 and Feb. 10, 2010, the entire contents of which are incorporated herein by reference.

BACKGROUND OF THE INVENTION (a) Field of the Invention

The present invention relates to a method and an apparatus for iterative determination of an multiple input multiple output iterative receiver.

(b) Description of the Related Art

In recent years, a mobile wireless communication system has been requiring transmission of mass data in order to support various multimedia wireless services. Therefore, in order to transmit the mass data by using limited frequency resources, a transmission technology to transfer high-speed data in parallel by using multiple transmitting/receiving antenna has been generally used. Compared with a system using a single antenna, this can theoretically increase a data transmission amount in proportion to the number of antennas without allocating additional frequencies or transmission power.

Various methods to transmit and receive the mass data by using the multiple transmitting/receiving antenna are being studied. A multiple input multiple output (hereinafter, referred to as 'MIMO') receiver which is actively being studied in recent years includes an MIMO iterative receiver. This has a structure in which by combining an MIMO detector and a decoder, an output value of the MIMO detector is transferred to an input value of the decoder and an output value of the decoder is again transferred to an input value of the MIMO detector and until the final output value of the decoder that is finally outputted reaches a desired performance, the above process is iterated.

Although an optimal performance can be acquired by ultimately increasing the iteration number of times, this cannot be actually implemented. Therefore, a method to operate the MIMO iterative receiver by previously determining the iteration number of times within an actually feasible predetermined performance range is used. As such, the iteration number of times in the known MIMO iterative receiver is verified through a performance simulation under various MIMO wireless channel environments depending on the used MIMO detector and decoder by using an extrinsic information transfer (EXIT) chart. In addition, through the process, the proper iteration number of times is determined.

However, it is impossible to verify the determination under all available MIMO wireless channel environments through a simulation. Further, it is impossible to variably determine the proper iteration number of times in real time under continuously changed wireless channel environments The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method and an apparatus that variably determine whether or not a demodulation procedure of a signal is iterated based on a cyclic redundancy check (CRC) result value without previously predicting and determining the iteration number of times in determining whether a signal received by an MIMO iterative receiver is iteratively demodulated.

An exemplary embodiment of the present invention provides a method for iterative determination of a multiple input multiple output (MIMO) iterative receiver that includes, detecting a soft value log likelihood ratio value in a received signal; decoding the detected soft value log likelihood ratio value in order to extract a first value and a second value from the detected soft value log likelihood ratio value; performing a CRC of the first value and verifying the result; performing a CRC of data burst and verifying the result when the CRC result of the first value is acknowledged; and iterating steps after the decoding on the basis of the second value when the CRC of the data burst is not acknowledged.

Another embodiment of the present invention provides a system for iterative determination of a multiple input multiple output iterative receiver that includes, a multiple input multiple output (MIMO) detector detecting a soft value log likelihood ratio value in a received signal; a deinterleaver deinterleaving the detected soft value log likelihood ratio value; a decoder extracting a first value and a second value by decoding the deinterleaved soft value log likelihood ratio value; a first cyclic redundancy check (CRC) verifier verifying a cyclic redundancy check result of the first value and verifying whether or not the CRC result of the first value is acknowledged; a burst assembler assembling bursts of the received signal of the burst unit and outputting them as data when the first CRC verifier verifies that the CRC result of the first value is acknowledged; a second CRC verifier verifying a CRC of the data outputted from the burst assembler and verifying whether or not the CRC result of the data is acknowledged; and an interleaver interleaving the deinterleaved soft log likelihood ratio value with the second value and feeding back it to the MIMO detector when any one of the first CRC verifier and the second CRC verifier verifies that the CRC result is not acknowledged.

DETAILED DESCRIPTION OF THE EMBODIMENTS

Figure 1:
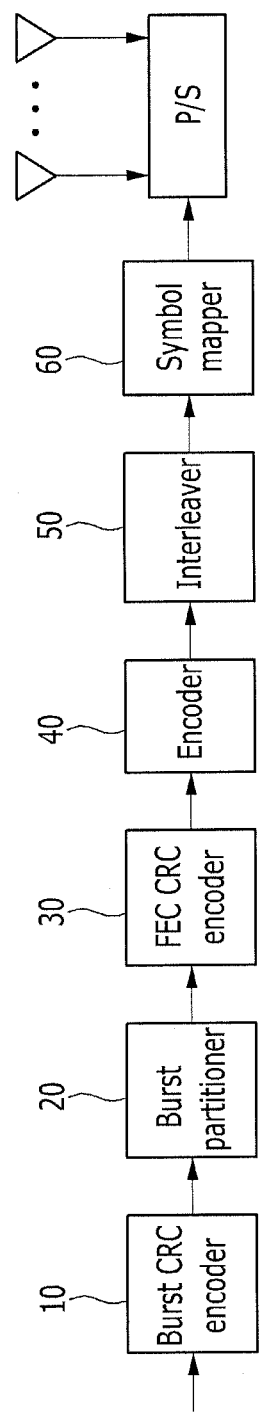
FIG. 1 is a structure diagram of a general MIMO transmitter.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification, unless explicitly described to the contrary, the word "comprise" and variations such as "comprises" or "comprising", will be understood to imply the inclusion of stated elements but not the exclusion of any other elements.

FIG. 1 is a structure diagram of a general MIMO transmitter.

As shown in FIG. 1, a burst CRC encoder 10 of a multiple input multiple output (hereinafter, referred to as 'MIMO') transmitter allocates a burst CRC value to a data burst received from an upper layer. A burst partitioner 20 again burst-partitions the data burst allocated with the CRC value by the encoding processing unit.

In addition, an FEC CRC encoder 30 allocates a CRC value to each encoding data unit again and an encoder 40 encodes data allocated with the CRC value. When the encoded data is interleaved by an interleaver 50 and is mapped with a symbol by a symbol mapper 60, the encoded data becomes final data to be transmitted through multi-antenna.

Therefore, in a general structure, a burst CRC encoder and an FEC CRC encoder which are two CRC added parts are included. However, since such a structure is limited to a predetermined specification such as IEEE 802.16m, a receiver that corresponds to the specification and is limited only to the predetermined specification is required to receive data.

Figure 2:
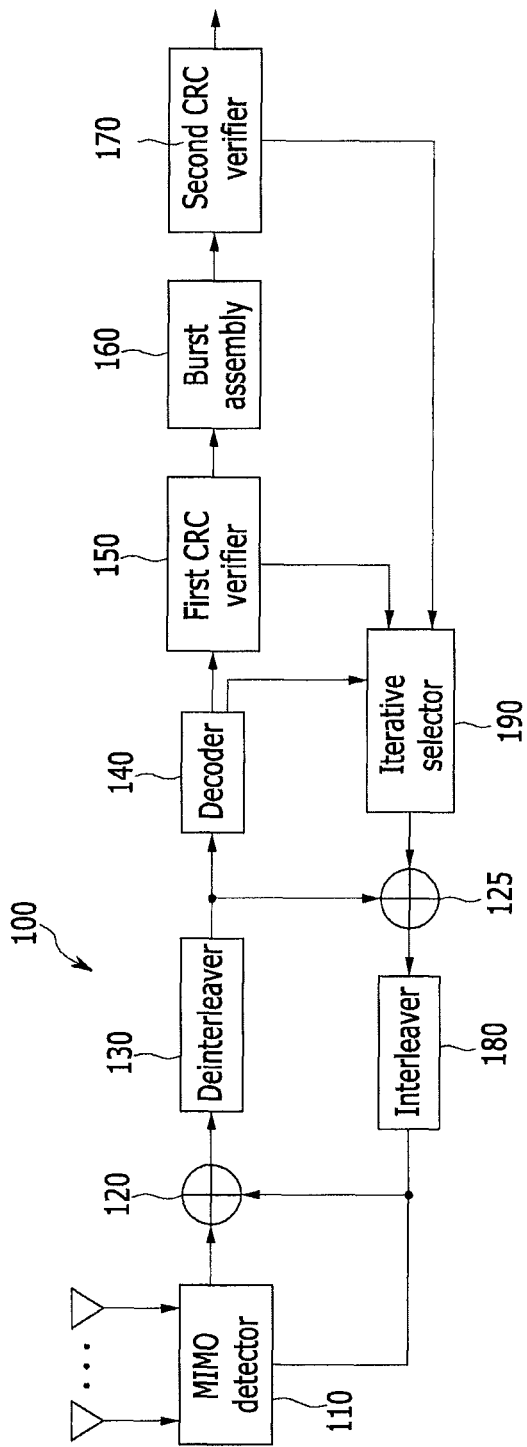
FIG. 2 is a structure diagram of an MIMO iterative receiver according to an exemplary embodiment of the present invention.

FIG. 2 is a structural diagram of an MIMO iterative receiver according to an exemplary embodiment of the present invention.

As shown in FIG. 2, the MIMO iterative receiver 100 according to the embodiment of the present invention includes an MIMO detector 110, a first adder 120, a second adder 125, a deinterleaver 130, a decoder 140, a first CRC verifier 150, a burst assembly 160, a second CRC verifier 170, an interleaver 180, and an iterative selector 190.

The MIMO detector 110 outputs a soft value log likelihood ratio value (hereinafter, for convenience of description, referred to as 'first soft value log likelihood ratio') in a received signal of a burst unit, which is outputted from a transmitter and received through the multi-antenna. That is, the first soft value log likelihood ratio value which is posterior information is outputted using a reception vector used for signal reception, a channel matrix for a signal transmission channel, and a received signal which is prior information. The process of outputting the soft value log likelihood ratio value from the received data has been already known and will not be described in detail in the embodiment of the present invention.

The first adder 120 receives the first soft value log likelihood ratio value outputted from the first MIMO detector 110 and a third soft value log likelihood ratio value outputted from the interleaver 180 to be described below. In addition, a soft value log likelihood ratio value (hereinafter, for convenience of description, referred to as 'second soft value likelihood ratio value') which is extrinsic information (LDE) is outputted by removing the third soft value log likelihood ratio value from the first soft value log likelihood ratio value.

The deinterleaver 130 receives the second soft value log likelihood ratio value outputted from the first adder 120, and deinterleaves and outputs the received second soft value log likelihood ratio value. That is, the transmitter performs deinterleaving inverted to interleaving performed before transmitting the data.

The decoder 140 receives the second soft value log likelihood ratio value deinterleaved and outputted from the deinterleaver 130 and outputs both a hard value and a soft value. The hard value is transferred to the first CRC verifier 150 and the hard value is used to determine whether or not the soft value will be transferred as an input value of the MIMI detector 110 again in accordance a CRC value. Whether or not the soft value will be transferred will be described later.

The first CRC verifier 150 receives the hard value outputted from the decoder 140 and verifies a forward error correction cyclical redundancy check (FEC CRC) to verify whether or not the CRC is successfully performed. If the CRC for the hard value is successfully performed (i.e. acknowledged), the received signal of the burst unit is transferred to the burst partitioner 160. Herein, a method of verifying whether or not the CRC is successfully performed or acknowledged has been already know, and thus, will not be described in detail in the embodiment of the present invention.

However, if the CRC is not successfully performed (i.e., acknowledged), the soft value of the decoder 140 is transferred to the MIMO detector 110 to perform the iteration process. At this time, the first CRC verifier 150 grasps the number of times that the CRC of the hard value was unsuccessful and judges whether or not the number of times is more than a predetermined number of times to perform the iteration process.

When the first CRC verifier 150 verifies that the CRC of the hard value is successfully performed (i.e., acknowledged), the burst assembly 160 assembles and outputs the received signals of the burst unit to data.

The second CRC verifier 170 receives the data outputted from the burst assembly 160 and verifies whether or not a CRC of a data burst is successively performed. If the CRC of the data burst is successfully performed (i.e., acknowledged), data is outputted. However, if the CRC is not successfully performed (i.e., not acknowledged), the soft value of the decoder 140 is transferred to the MIMO detector 110 to perform the iteration process. At this time, the second CRC verifier 170 grasps the number of times the CRC of the data burst is not successfully performed or not acknowledged and judges whether or not the number of times is more than a predetermined number of times to perform the iteration process in the same manner as the first CRC verifier 150.

When the first CRC verifier 150 or the second CRC verifier 170 verifies that the CRC of the hard value or the CRC of the data burst is not successfully performed or not acknowledged, the iterative selector 190 outputs the soft value outputted and received from the decoder 140.

The second adder 125 outputs the soft value log likelihood ratio value (hereinafter, for convenience of description, referred to as 'third soft value log likelihood ratio value') removed with the hard value by using the soft value outputted from the iterative selector 190 and the second soft value log likelihood ratio value outputted from the deinterleaver 130.

The interleaver 180 interleaves the third soft value log likelihood ratio value outputted from the second adder 125. The interleaved third soft value log likelihood ratio value is fed back to the first adder 120 and the MIMO detector 110 and the iteration process is performed until the CRC value is successfully outputted.

An operation of the above-mentioned MIMO iterative receiver will be described with reference to FIG. 3.

Figure 3:
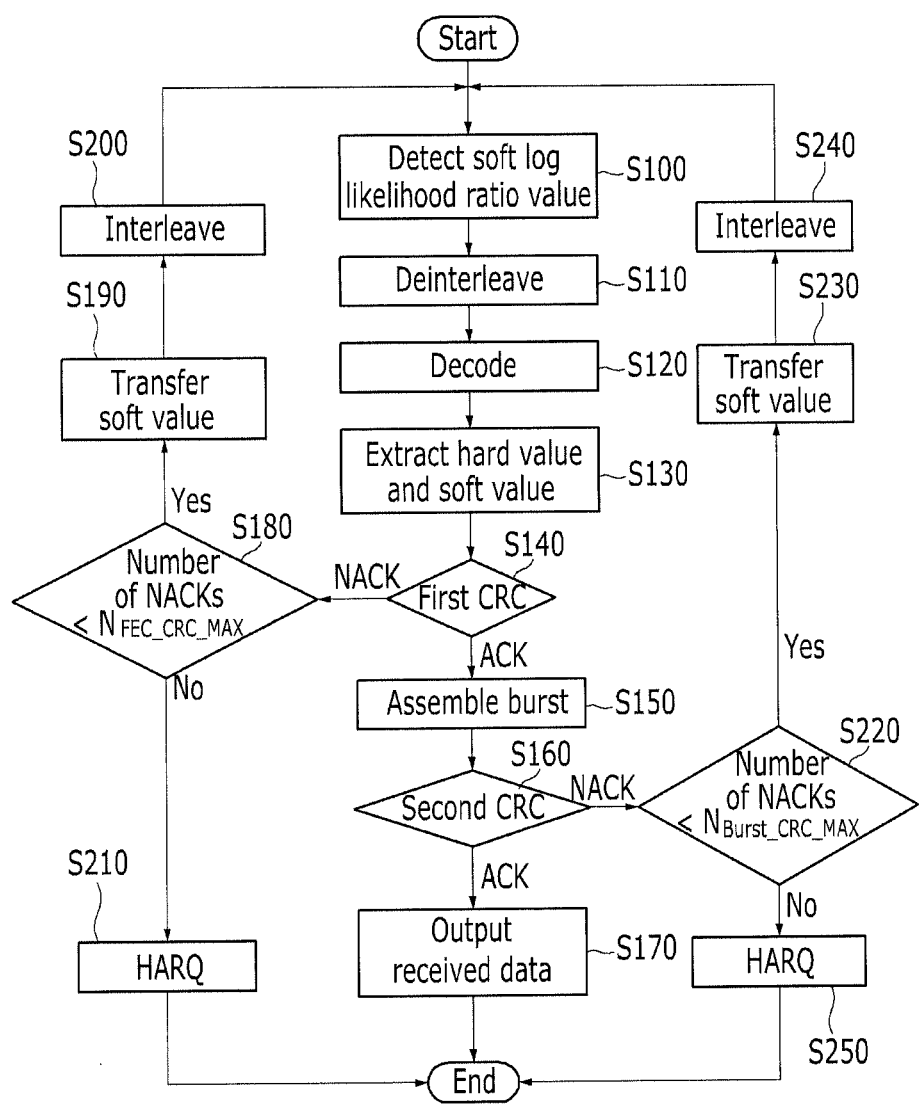
FIG. 3 is an operational flowchart of an MIMO iterative receiver according to an exemplary embodiment of the present invention.
Figure 4A:
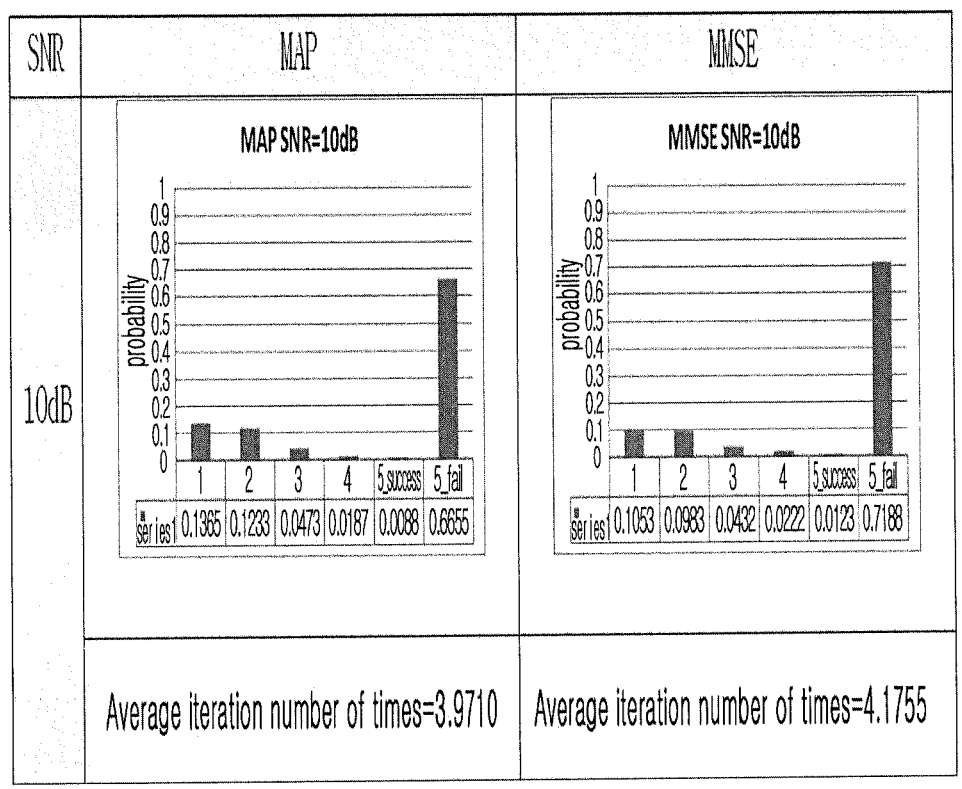
FIGS. 4A to 4H are exemplary diagrams showing a signal to noise ratio and the iteration number of times depending on an MIMO detection method according to an exemplary embodiment of the present invention.
Figure 4B:
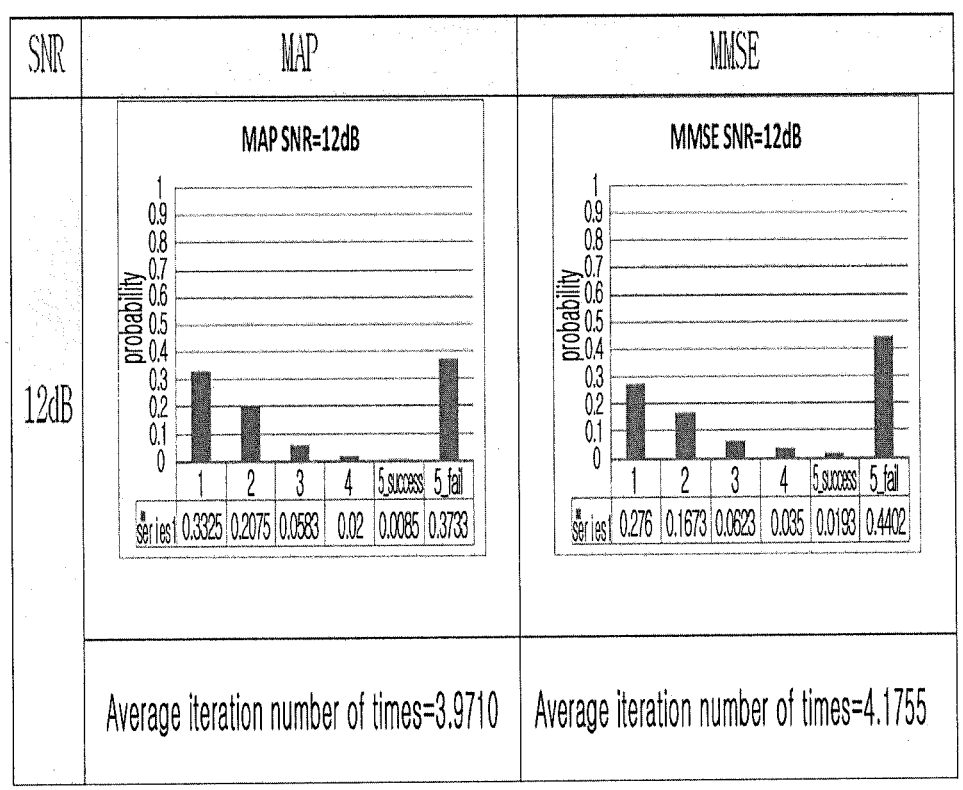
Figure 4C:
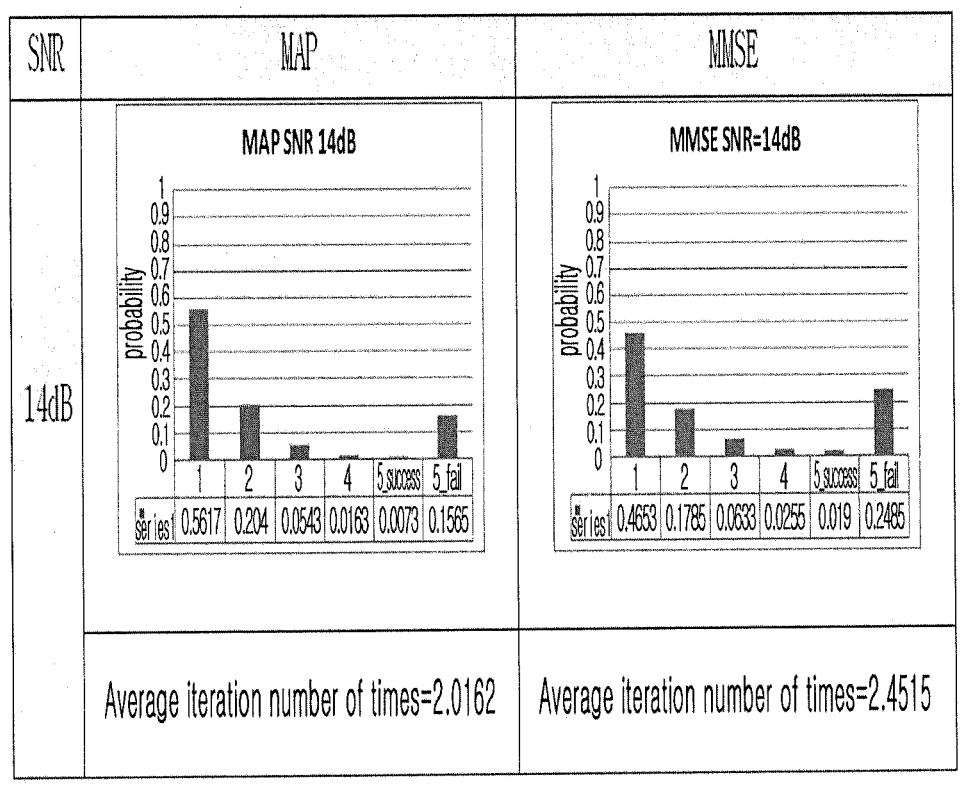
Figure 4D:
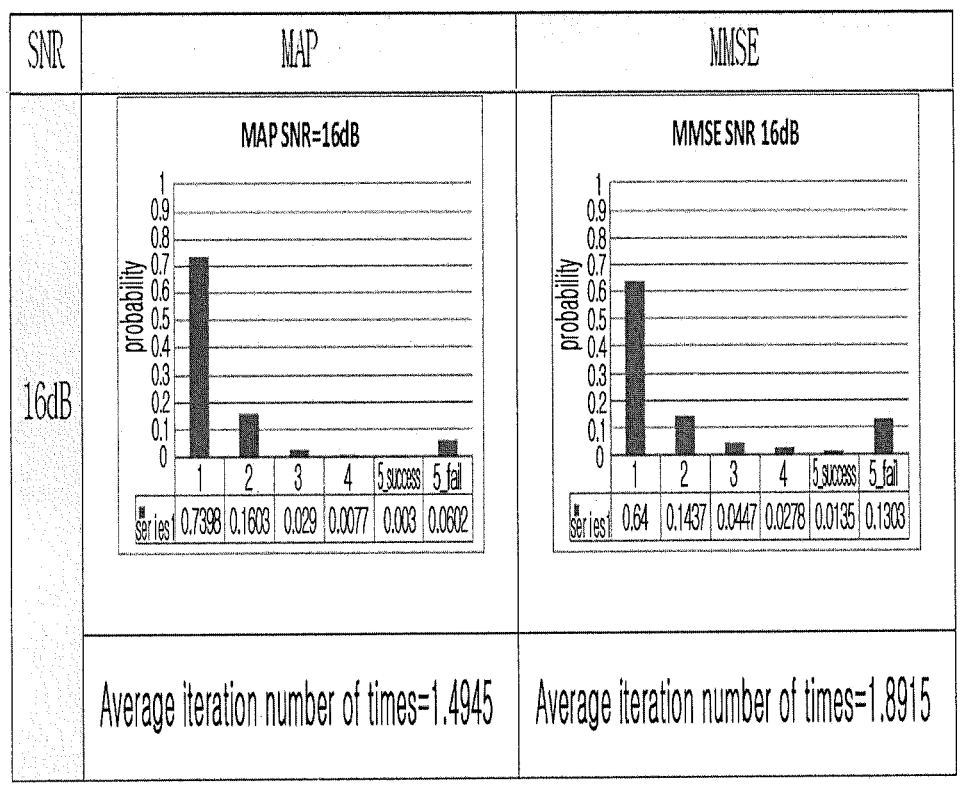
Figure 4E:
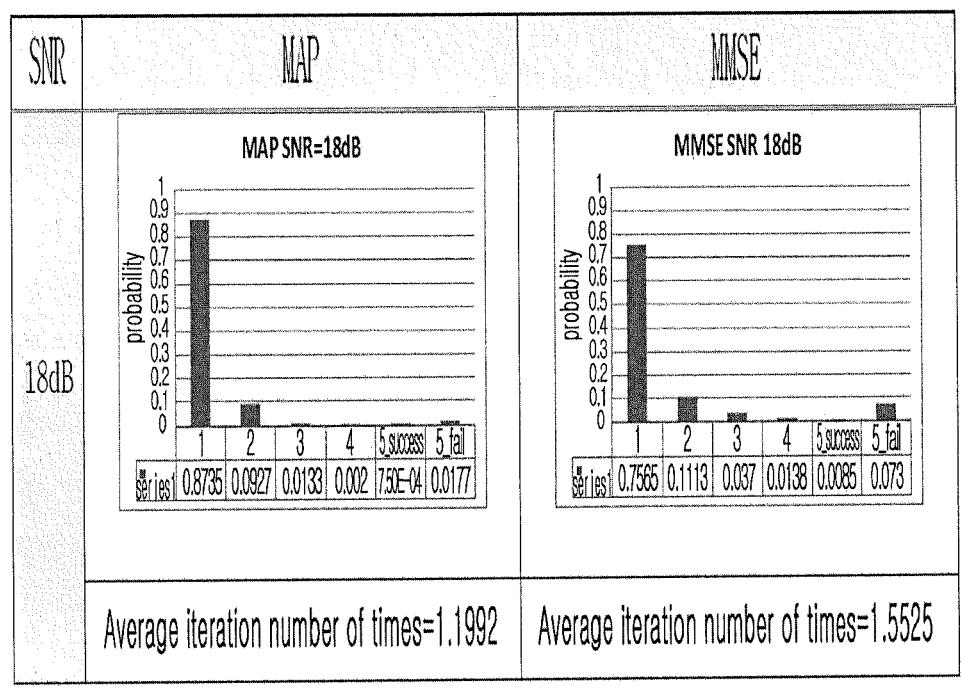
Figure 4F:
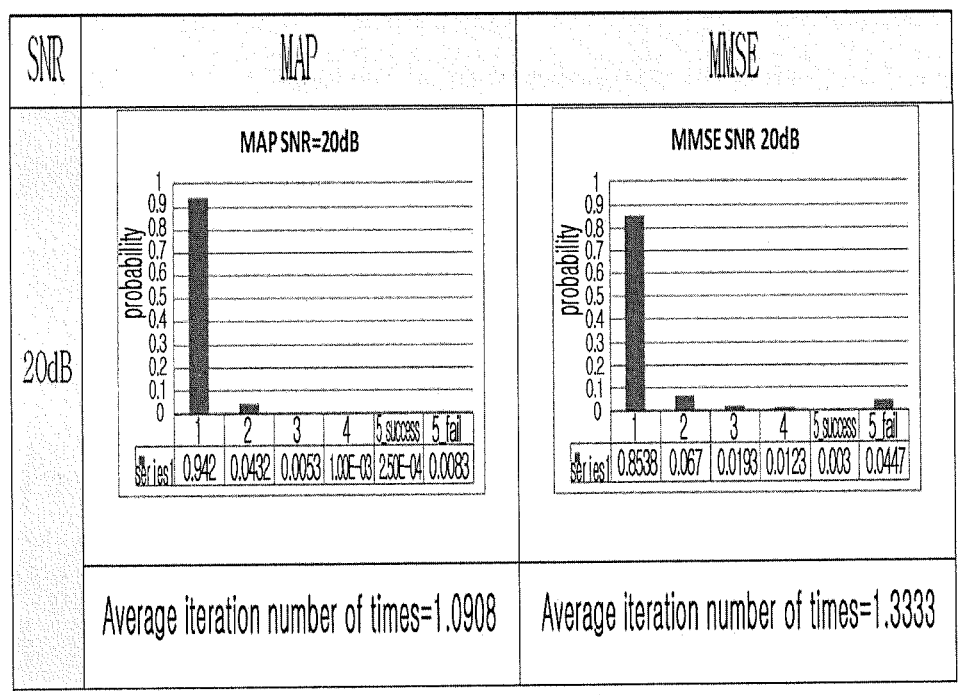
Figure 4G:
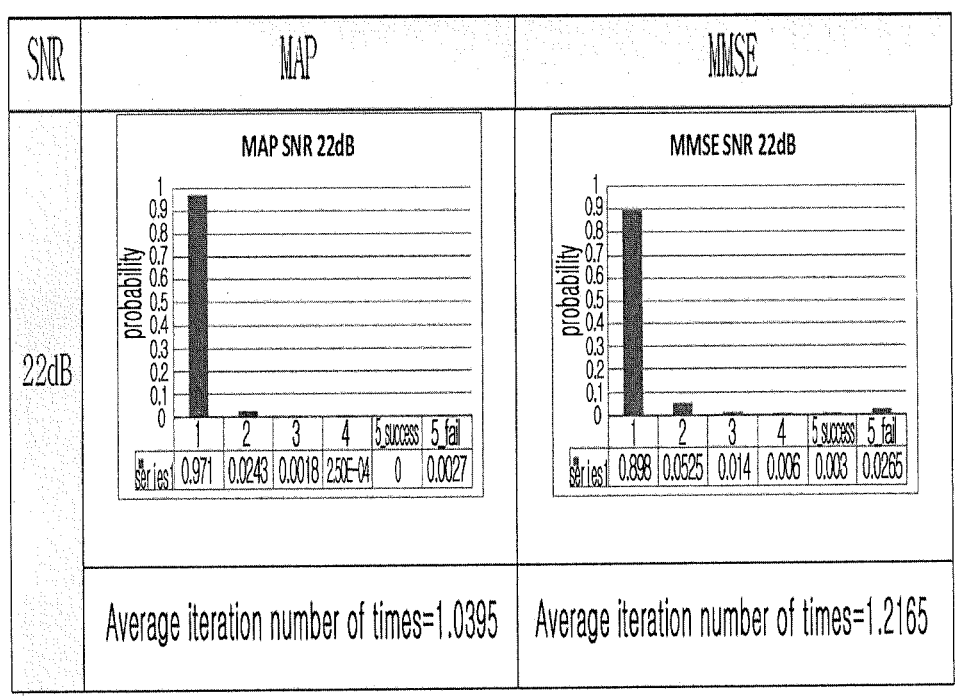
Figure 4H:
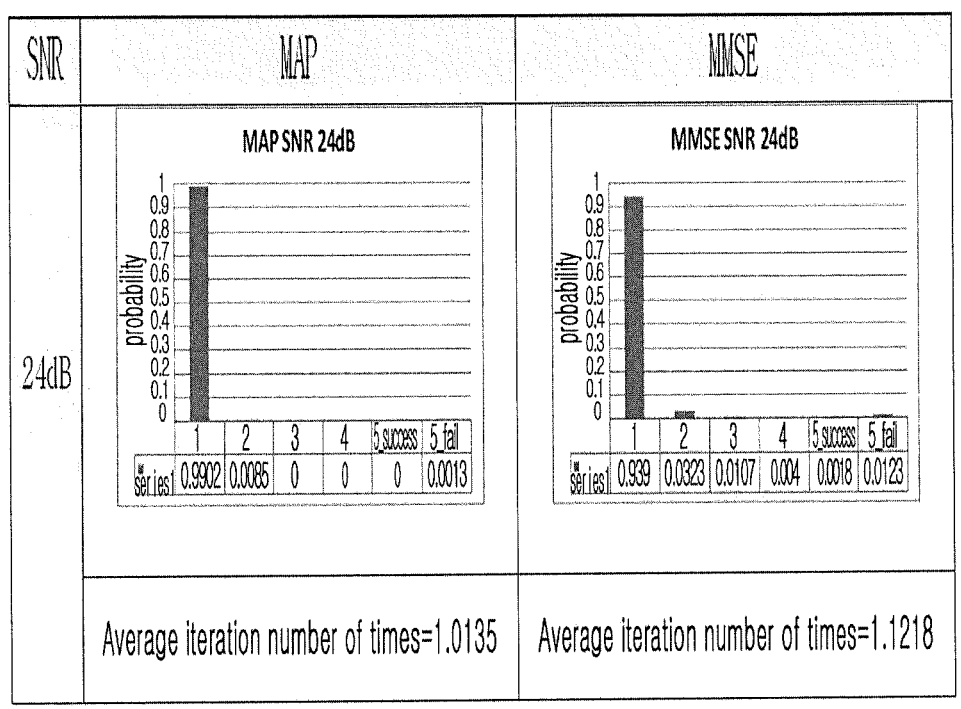

FIG. 3 is an operational flowchart of an MIMO iterative receiver according to an exemplary embodiment of the present invention.

As shown in FIG. 3, an MIMO detector 110 demodulates a signal outputted from a transmitter and received through a multi-antenna and detects a first soft value log likelihood ratio value (S100). A first adder 120 outputs a second soft value log likelihood ratio value by using the first soft value log likelihood ratio value detected by the MIMO detector 110 and a third soft value log likelihood ratio value outputted from an interleaver 180 and the second soft value log likelihood ratio value is inputted into a deinterleaver 130 and deinterleaved (S110).

The deinterleaved and outputted second soft value log likelihood ratio value is inputted into a decoder 140 and decoded to be divided into a hard value and a soft value (S120). The hard value is inputted into a first CRC verifier 150 (S130) and the soft value is inputted into an iterative selector 190. First, a first CRC verifier 150 receiving the hard value verifies an FEC CRC of the hard value to judge whether the verified CRC is successfully performed (i.e., acknowledged) or not successfully performed (i.e., not acknowledged) (S140).

If not successfully performed (i.e., acknowledged), the first CRC verifier 150 compares NFEC_CRC_MAX number of times with the number of times the CRC was unsuccessful (S180). NFEC_CRC_MAX number of times represents the predetermined maximum CRC number of times. When the number of times is less than NFEC_CRC_MAX number of times, the soft value of the decoder 140 is transferred as an input of the iterative selector 190 (S190) and interleaved by the interleaver 180 (S200), such that the MIMO iterative receiver operates once again. However, when the number of times is more than NFEC_CRC_MAX number of times, the MIMO iterative receiver stops and an HARQ is performed (S210) by requesting re-transmission from a transmitter.

On the contrary, when the CRC result of the hard value at step S140 is acknowledged (i.e., CRC on hard value was successfully performed), a signal of a burst unit is inputted into a burst assembly 160 and assembled to data (S150). A second CRC verifier 170 performs a burst CRC for the assembled and generated data again to judge whether or not the check result is acknowledged (i.e., CRC was successfully performed) or not acknowledged (i.e., CRC was not successfully performed) (S160).

If the judgment result at step S160 is acknowledged, data is outputted in order to transfer the finally assembled data burst to an upper layer (S170). However, if the judgment result is not acknowledged, the second CRC verifier 170 compares NBurst_CRC_MAX number of times with the number of times the CRC was unsuccessful (S220) to judge whether the number of times is less than NBurst_CRC_MAX number of times.

When the number of times is less than NBurst_CRC_MAX number of times, the soft value of the decoder 140 is transferred as an input of the iterative selector 190 (S230) and interleaved by the interleaver 180 (S240), such that the MIMO iterative receiver operates once again. However, when the number of times is more than NBurst_CRC_MAX number of times, the MIMO iterative receiver stops and the HARQ is performed by requesting re-transmission from a transmitter (S250).

Herein, the values of NFEC_CRC_MAX and NBurst_CRC_MAX are properly selectable depending on wireless channel environments and requirements. For example, the values are selectable depending on various requirements to operate or not to operate the MIMO iterative receiver or to operate the MIMO iterative receiver only at the FEC stage, or to operate the MIMO iterative receiver only at the burst stage.

Next, the performance of the MIMO iterative receiver according to an exemplary embodiment of the present invention will be described through a simulation with reference to FIGS. 4A to 4H.

FIGS. 4A to 4H are exemplary diagrams showing a signal to noise ratio and distribution of the iteration number of times depending on an MIMO detection method according to an exemplary embodiment of the present invention.

Prior to the description, parameters applied to the simulation are shown in Table 1.

TABLE 1

| Parameter | 16 bit burst CRC generator | $g_{CRC}(D) = D^{16} + D^{12} + D^5 + 1$ |
|---|---|---|
| Parameter | Burst size($N_{DB}$) | 181 byte = 1448 bit |
| Parameter | Burst partition($N_{FB}$) | 1 |
| FEC encoder | Channel code(Channel Code) | Convolution code |
| FEC encoder | Code rate(Code rate) | 1/2 |
| FEC encoder | code generator | G[7, 5] |
| Detector | MAP detector, MMSE detector | |
| Iteration | w/o CRC | Iterated at five times (fixed) |
| Iteration | w/CRC | $N_{CRC\_MAX} = 5$ |
| channel | Rayleigh fading channel | |
| modulation | 16 QAM | |

In the exemplary embodiment of the present invention, it is assumed that one process not including the HARQ exists and it is assumed that the maximum iteration number of times is determined as 5 in the receiver and in the 5-th iteration, the simulation is performed for each of an acknowledged case and a not acknowledged case. However, the present invention is not necessarily limited thereto.

When by applying the parameters of Table 1, distribution of the iteration number of times depending on the signal to noise ratio and the MIMO detection method is expressed by a probability, as shown in FIGS. 4A to 4H, at a low signal to noise ratio, the CRC is more frequently not successfully performed. The received signal is difficult to output within the determined maximum iteration number of times, such that the iteration number of time is frequently the maximum in the receiver. Therefore, the average iteration number of times comparatively larger than the high signal to noise ratio is acquired.

On the contrary, since a probability that the error will be generated in the FEC block is low at the high SNR, most signals are outputted after first iteration. Accordingly, when the signal has the high SNR, the signal is easily outputted even though the iteration number of times of the receiver is small in comparison with the case in which the signal has the low SNR.

In describing a difference in performance depending on the type of the MIMO detector, since the MMSE detector has a higher probability that the error will be generated in the receiver than the MAP detector, the iteration number of time in the receiver is increased. According to the simulation result, the average iteration number of times of the MMSE detector is more than the average iteration number of times of the MAP detector at all SNRs. Therefore, it is effective to use the MAP detector in order to decrease the iteration number of times of the receiver.

Next, the signal to noise ratio (SNR) and the average iteration number of times according to the MIMI detection method will be described with reference to FIG. 5.

Figure 5:
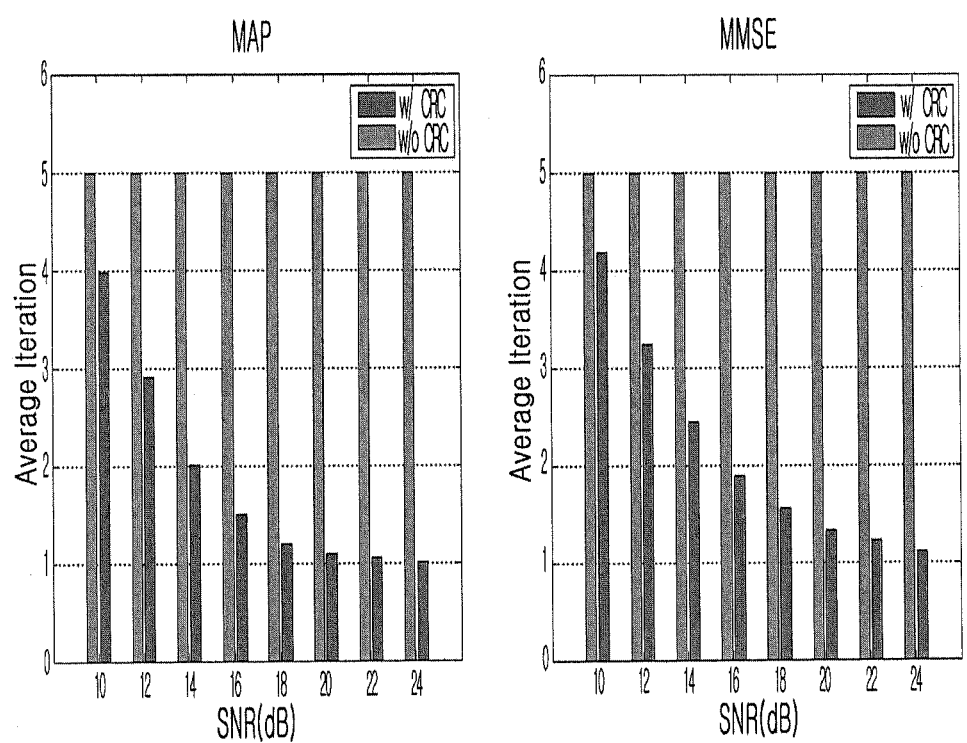
FIG. 5 is an exemplary diagram showing a signal to noise ratio and the average iteration number of times depending on an MIMO detection method according to an exemplary embodiment of the present invention.

FIG. 5 is an exemplary diagram showing a signal to noise ratio and the average iteration number of times depending on an MIMO detection method according to an exemplary embodiment of the present invention.

As shown in FIG. 5, when the iteration number of times is variably adjusted applying the CRC, the iteration number of times is variably decreased depending on the signal to noise ratio or the detector. Accordingly, it is possible to decrease the iteration number of times by using the high SNR or the detector having high performance.

Next, performance depending on where or not the HARQ is used will be described with reference to FIG. 6.

Figure 6:
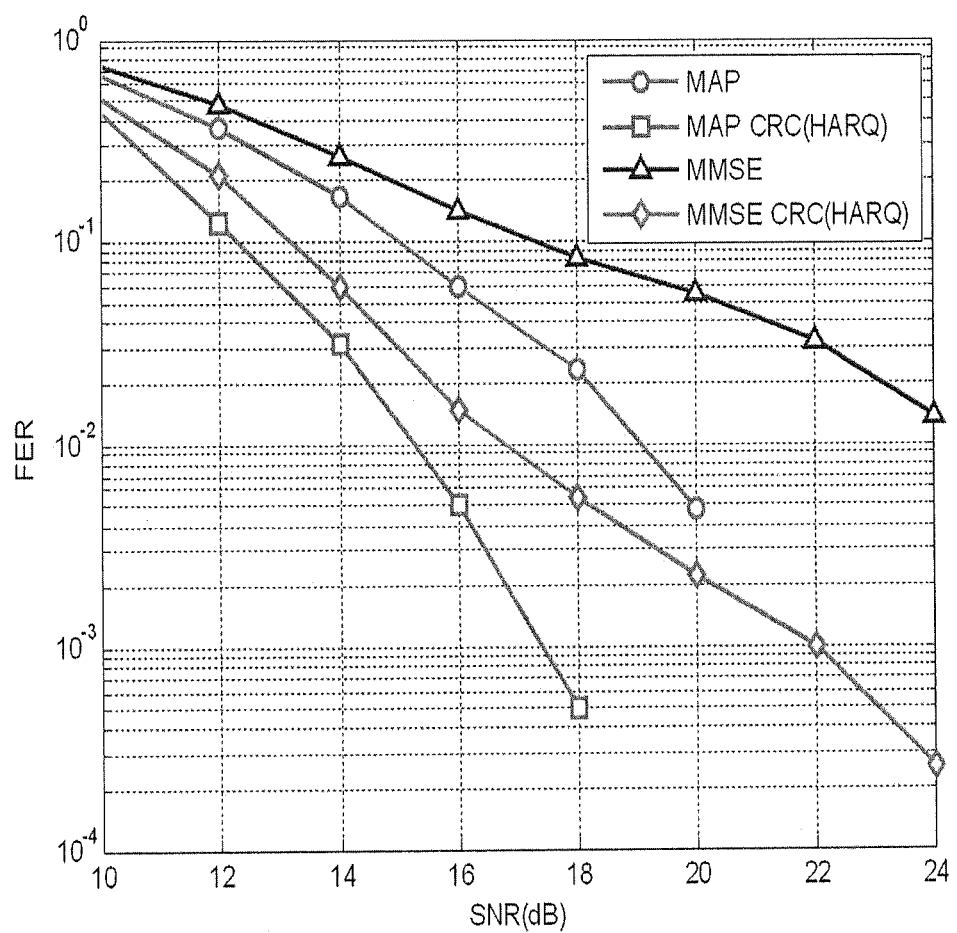
FIG. 6 is an exemplary diagram comparing a performance depending on using HARQ or not according to an exemplary embodiment of the present invention.

FIG. 6 is an exemplary diagram comparing a performance depending on using HARQ or not according to an exemplary embodiment of the present invention.

As shown in FIG. 6, assumed that the HARQ is used in an iterative receiver adopting CRC only at one time, the performance is improved through retransmission in the case of calling the HARQ.

Next, the performance of a general iterative receiver not using the HARQ and the performance of the iterative receiver according to the exemplary embodiment of the present invention will be described with reference to FIG. 7.

Figure 7:
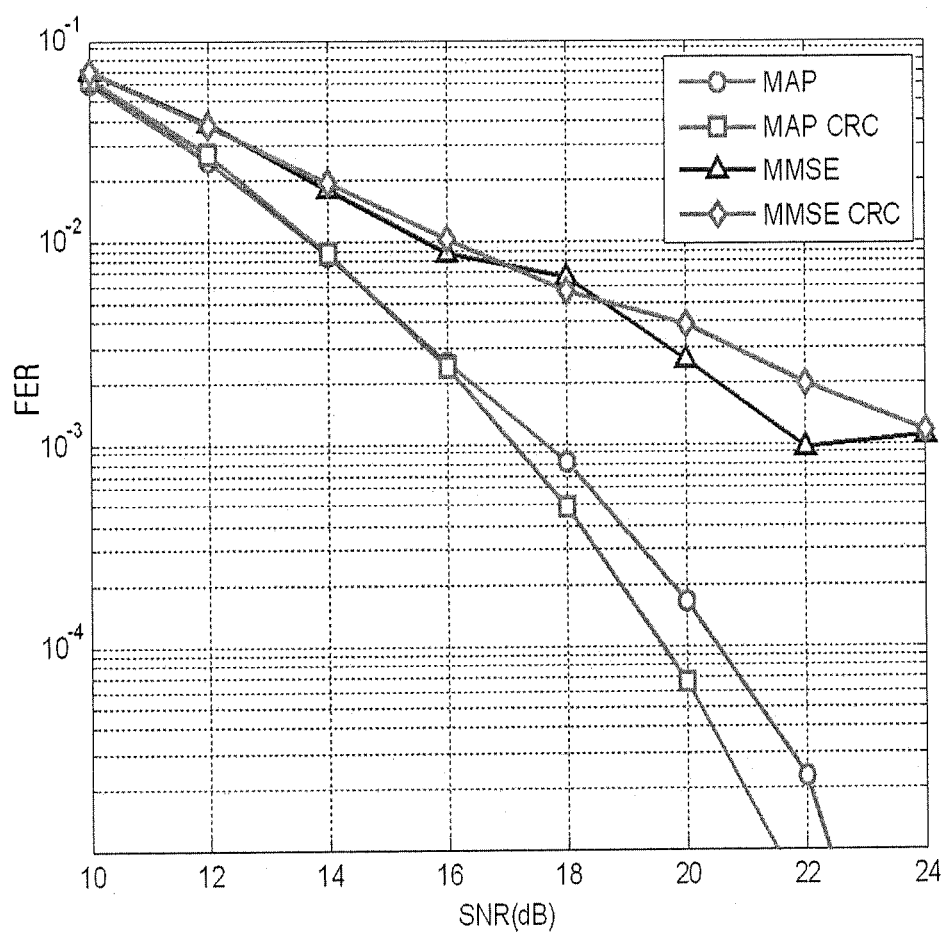
FIG. 7 is an exemplary diagram comparing performances of a case not using HARQ and a general method according to an exemplary embodiment of the present invention.

FIG. 7 is an exemplary diagram comparing performances of a case not using HARQ and a general method according to an exemplary embodiment of the present invention As shown in FIG. 7, it is assumed that when the HARQ is not used, that is, even though the iteration number of times of the receiver reaches the maximum iteration number of times and the acknowledged determination is not acquired, an output value is just used. In this case, when the fixed iteration number of times of the existing iterative receiver is the same as the maximum iteration number of times according to the exemplary embodiment of the present invention, the performances of the receivers are similar to each other, but the method according to the exemplary embodiment of the present invention can decrease the average iteration number of times during the iterative determination by the CRC.

According to an exemplary embodiment of the present invention, it is possible to determine iteration or not in a receiver. In addition, since it can be determined whether or not a reception block has an error, unnecessary iteration can be reduced. Accordingly, the average iteration number of times can be decreased in a receiver and as a result, the complexity of the receiver can be reduced. Further, HARQ can be additionally adopted using CRC and when the average iteration number of times is larger than the predetermined iteration number of times, system performance can be improved through retransmission. That is, it is possible to improve a system performance by applying HARQ.

The above-mentioned exemplary embodiments of the present invention are not embodied only by an apparatus and method. Alternatively, the above-mentioned exemplary embodiments may be embodied by a program performing functions, which correspond to the configuration of the exemplary embodiments of the present invention, or a recording medium on which the program is recorded. These embodiments can be easily devised from the description of the above-mentioned exemplary embodiments by those skilled in the art to which the present invention pertains.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for iterative determination of a multiple input multiple output (MIMO) iterative receiver, comprising:
    detecting a soft value log likelihood ratio value in a received signal;
    obtaining a first value and a second value from the detected soft value log likelihood ratio value by decoding the detected soft value log likelihood ratio value;
    performing a cyclic redundancy check (CRC) on the first value and verifying whether or not the CRC on the first value is successfully performed;
    performing a CRC on a data burst and verifying whether or not the CRC on the data burst is successfully performed when the CRC on the first value is successfully performed; and
    iterating steps after the decoding on the basis of the second value when the CRC on the data burst is not successful.

2. The method of claim 1, further comprising:
    when the CRC on the first value is not successful,
    comparing a predetermined number of times with a number of times indicating how many times the CRC on the first value was not successful; and
    iterating the steps after the decoding by using the second value when the number of times indicating how many times the CRC on the first value is smaller than the predetermined number of times.

3. The method of claim 2, further comprising:
    when the number of times indicating how many times the CRC on the first value was not successful is larger than the predetermined number of times,
    requesting a re-transmission to a transmitter, thereby stopping the operation of the MIMO iterative receiver.

4. The method of claim 3, wherein:
    the first value is a hard value and the second value is a soft value.

5. The method of claim 1, wherein:
    the iterating the steps after the decoding includes,
    comparing the number of times indicating how many times the CRC on the data burst was not successful with a predetermined number of times; and
    iterating the steps after the decoding on the basis of the second value when the number of times of the CRC of the data burst is smaller than the predetermined number of times.

6. The method of claim 5, further comprising:
    when the number of times of the CRC of the data burst is larger than the predetermined number of times,
    requesting a re-transmission to a transmitter, thereby stopping the operation of the MIMO iterative receiver.

7. The method of claim 1, further comprising:
    when the CRC on the data burst is successful,
    outputting data from the received signal.

8. The method of claim 1, wherein:
    the decoding further includes,
    deinterleaving the soft log likelihood ratio value.

9. The method of claim 1, wherein:
    the verifying whether or not the CRC on the data burst is successfully performed further includes,
    assembling the received signal into the data burst by the burst unit.

10. A system for iterative determination of a multiple input multiple output iterative receiver, comprising:
    a multiple input multiple output (MIMO) detector detecting a soft value log likelihood ratio value in a received signal;
    a deinterleaver deinterleaving the detected soft value log likelihood ratio value;

a decoder extracting a first value and a second value by decoding the deinterleaved soft value log likelihood ratio value;
a first cyclic redundancy check (CRC) verifier verifying a cyclic redundancy check result of the first value by determining whether or not the CRC result is acknowledged;
a burst assembler assembling bursts of the received signal of the burst unit and outputting them as data when the first CRC verifier verifies that the CRC result of the first value is acknowledged;
a second CRC verifier verifying a CRC of the data outputted from the burst assembler and verifying whether or not the CRC result of the data is acknowledged; and
an interleaver interleaving the deinterleaved soft log likelihood ratio value with the second value and feeding back it to the MIMO detector when any one of the first CRC verifier and the second CRC verifier verifies that the CRC result is not acknowledged.

11. The system of claim 10, further comprising:
an iterative selector transmits the second value outputted from the decoder to the interleaver when any one of the first CRC verifier and the second CRC verifier verifies that the CRC result is not acknowledged.

12. The system of claim 10, wherein:
the first CRC verifier determines whether or not a first number of times indicating how many times the CRC of the first value was not acknowledged is larger than a first predetermined number of times when the CRC result of the first value is not acknowledged, and
the second CRC verifier determines whether or not a second number of times indicating how many times the CRC of the data outputted from the burst assembler was not acknowledged is larger than a second predetermined number of times when the CRC result of the data is not acknowledged.

* * * * *